Dec. 15, 1959

M. C. FERRE 2,917,729

PULSE ANALYZER

Filed Aug. 27, 1954

INVENTOR.
MAURICE C. FERRE

BY *William R. Sherman*

HIS ATTORNEY

United States Patent Office 2,917,729
Patented Dec. 15, 1959

2,917,729
PULSE ANALYZER

Maurice C. Ferre, Ridgefield, Conn., assignor, by mesne assignments, to Schlumberger Well Surveying Corporation, Houston, Tex., a corporation of Texas Application August 27, 1954, Serial No. 452,591

4 Claims. (Cl. 340—213)

This invention relates to the analysis of electric pulses and pertains, more particularly, to the presentation of electric pulse signals, as may be derived from a radiation detector, in a form representing their amplitude or pulse height distribution.

A variety of phenomena may be represented by an electric signal composed of pulses having significant maximum values. For example, in the detection of radiation by scintillation or proportional counters, an aperiodic pulse signal is obtained wherein the maximum amplitudes of the pulses are representative of the radiation energy level. As such phenomena are frequently of a statistical nature, the rate of recurrence or time distribution of pulse heights for a signal is often significant to measurement and interpretation of the phenomena.

One system employed heretofore for the presentation of pulse height distributions comprises a cathode ray oscilloscope having a viewing screen across which traces are swept in linear correspondence with the time-amplitude relation of the pulses of the applied signal. In order that this trace of the time-amplitude relation of successive pulses may appear as a line spectrum of pulse height distribution along the vertical axis, the signal applied to the oscilloscope is derived from a pulse stretcher circuit which so increases the time duration of each pulse that its time-amplitude relation appears as a horizontal line on the oscilloscope screen. As a result of this stretching, however, pulses will tend to overlap at high counting rates, precluding their accurate representation on the screen. The addition of the pulse stretcher circuit also tends to introduce non-linearities in the representation of pulse heights as well as increasing the expense and complexity of the apparatus.

Accordingly, it is an object of this invention to provide new and improved apparatus for overcoming these disadvantages of the prior art system described above.

Another object of this invention is to provide new and improved apparatus for presenting pulse height distributions of electric pulse signals in a form for more accurate and speedy analysis than hitherto achieved and capable of operation at higher counting rates.

Yet another object is to provide new and improved apparatus which will facilitate accurate quantitative and qualitative analysis of radioactivity phenomena.

These and other objects are attained, briefly, by applying an electric pulse signal, as obtained from a radiation detector, to one deflection circuit for a cathode ray tube and applying the time derivative of this signal simultaneously to the transverse deflection circuit. A trace on the cathode ray screen is produced for each successive pulse, with the maximum value of each pulse being located at a point where the trace crosses a reference signal deflection axis transversely. To provide a line spectrogram of the pulse height distribution suitable for quantitative analysis, the transverse portions of the traces identifying the maximum pulse values are amplified and presented selectively without increasing the time duration of the original pulses.

In a modification of the invention, the electron beam of the cathode ray tube impinges on targets thereby activating associated counters which provide an indication of the pulse height spectrum.

Other objects and advantages of this invention will become apparent from the following detailed description taken in conjunction with the drawings in which.

Figure 1:
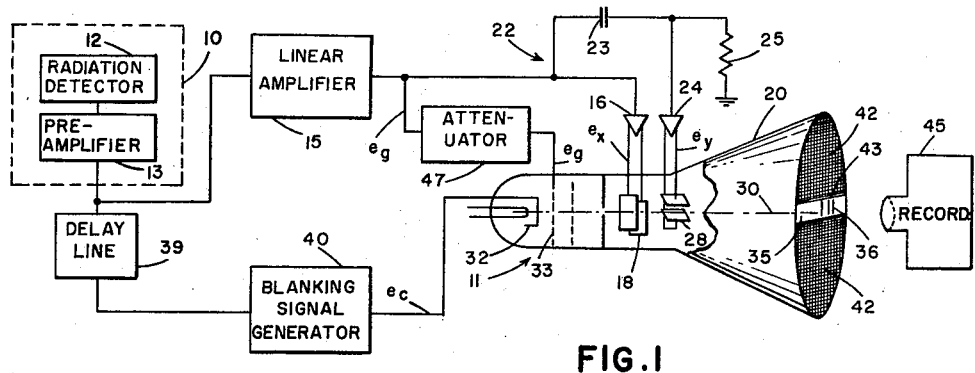
Fig. 1 is a schematic diagram of apparatus embodying the invention.

In Fig. 1 is shown radiation analyzing apparatus in accordance with the invention which comprises a source 10 of pulse signals together with a pulse analyzing device 11 arranged to indicate maximum pulse values for the signal and more particularly, to display the pulse height distribution for pulse signals from the source 10. The source 10 comprises a radiation detector 12 such as a scintillation or proportional counter which produces aperiodic pulses of varying maximum values. The maximum pulse values for the detector signal may, for example, be of significance in the determination of radiation energy levels.

In one application, the radiation detector 12 and a pulse signal preamplifier 13, each of which may be of known design, are included in a portion of radioactivity well logging equipment adapted to traverse a borehole, while the indicating device 11 is located at the earth's surface. The representation of pulse maxima thus obtained may be employed for geophysical analysis of earth strata.

The pulse analyzing device 11 of the radiation analyzing system shown in Fig. 1 includes a linear amplifier 15 of conventional design having its input coupled to the output circuit of the preamplifier 13 and its output coupled to the input circuit of a horizontal deflection amplifier 16. The deflection amplifier 16 may, for example, be of a conventional single-ended-input, balanced-output type and is coupled to horizontal deflection plates or elements 18 of a cathode ray tube 20. The output circuit of the linear amplifier 15 is also coupled to a differentiating circuit including a capacitor 23 for coupling the amplifier 15 to the input circuit of a vertical deflection amplifier 24 and a shunt resistor 25 connected across the input circuit of the amplifier 24. The vertical deflection amplifier 24 may be similar in construction to the horizontal deflection amplifier 16, and its output circuit is coupled to vertical deflection plates or elements 28.

Figure 2A:
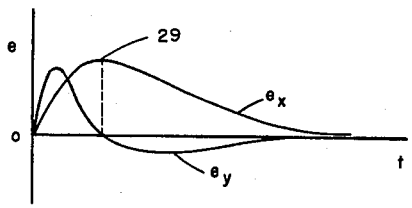
Figs. 2a and 2b are graphic representations of the time relationships for signals employed in the apparatus of Fig. 1.

Accordingly, while the signal applied to horizontal deflection plates 18 is proportional to the pulse signal from source 10, as represented by curve $e_x$ in Fig. 2a by a plot of pulse amplitude against time, the signal applied to vertical deflection plates 28 is proportional to the time derivative of the pulse signal, being represented by a curve $e_y$ plotted on the same coordinates in Fig. 2a. It will be observed that curve $e_x$ exhibits a maximum value identified by reference character 29 at an instant in time when the derivative curve $e_y$ passes through zero amplitude. The curves $e_x$ and $e_y$ represent, of course, only a single pulse of the signal and its derivative, which will commonly comprise a great multitude of pulses generally arriving in aperiodic fashion. Successive pulses will characteristically differ in amplitude but not in shape so that the time occurrence of the maximum value 29 will generally follow the initiation of the pulse by a fixed period on the order of several microseconds, for example.

The signals $e_x$ and $e_y$ applied to the horizontal and vertical deflection plates 18, 28 will serve to deflect a beam 30 of electrons derived from the cathode 32 of the cathode ray tube 20. The cathode ray tube, which may be of conventional design, also includes a control grid 33 for regulating the intensity of the electron beam 30 so as to control the luminosity of the visible trace produced by the beam as it impinges upon a phosphorescent viewing screen 35. For convenience, certain portions of the circuitry conventionally associated with cathode ray tubes, such as that employed for accelerating the electrons of the beam 30 and that employed for establishing the zero signal position of the beam, are not shown.

Since the beam 30 will be deflected simultaneously along the $x$ axis and the $y$ axis of the viewing screen 35 in accordance with the instantaneous values of a pulse signal $e_x$ and its time derivative $e_y$, a complete pulse, as represented in Fig. 2a, would be represented on the viewing screen 35 by a visible trace 36 of closed loop form. The zero signal position, indicated by reference character 37, is conveniently adjusted in a known manner at a position on the left end of the $x$ axis which utilizes the screen advantageously in presenting the trace 36. Hence, the beam 30 will impinge at point 37 in the absence of a pulse signal and will be deflected to the right in proportion to the signal $e_x$ and upwardly or downwardly in accordance with the amplitude and polarity of the time derivative signal $e_y$. Where the pulse signal $e_x$ also has negative values, the trace 36 will, of course, extend also to the left of the point 37. In either event, as may be discerned from Fig. 2a, the maximum value of the pulse signal $e_x$ occurs at the point 29 when the derivative signal $e_y$ is zero and, hence, will be represented by the point at which the trace 36 crosses the $x$ axis, as is indicated by the reference character 29'.

Figure 3:
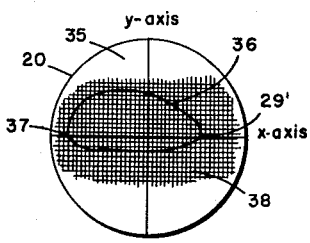
Fig. 3 is an elevational view of the unmasked screen of the cathode ray tube represented in Fig. 1 illustrating a single, complete pulse pattern which may be obtained with continuous beam tracing.

Since the signal $e_x$ on the horizontal deflection plates 18 is at a maximum value when the beam 30 is at the point 29', the point 29' will represent the maximum value of the trace 36 measured along the $x$ axis from the zero point 37. Hence, the slope of the trace 36 at the point 29' will be vertical or, in other words, the trace 36 will cross the $x$ axis transversely at the point 29'. It will be understood that the $x$ and $y$ axes may be merely imaginary coordinates on the viewing screen 35 representing, respectively, the path of beam deflection for a horizontal deflection signal only and for a vertical deflection signal alone. However, in Fig. 3, the $x$ and $y$ axes together with rectilinear coordinate lines 38 are shown superimposed on the screen 35 to facilitate an understanding of the position of the trace 36 upon the screen.

While the maximum amplitude of one or several pulses represented together on the screen 35 by complete loop traces 36 may readily be determined by locating their transverse intersection with the $x$ axis, the pulse signal $e_x$ for most applications will comprise a great multitude of rapidly recurring pulses. It is convenient for interpretation to have the pulse height distribution for these multiple pulse signals represented in the form of a line spectrum so that conventional spectrographic techniques of analysis may be employed which depend upon a line spectrum presentation. Thus, only the portion of the trace 36 immediately adjacent the maximum point 29' need be incorporated in the presentation. Accordingly, the preamplifier 13 is also coupled to the input circuit of a delay line 39 which is coupled to a blanking signal generator 40. The delay line 39 may be of any conventional design serving to delay a pulse to the blanking signal generator by a short period of time, such as several microseconds for example. The blanking signal generator 40, in turn, may be coupled to the cathode 32 of the cathode ray tube and, in the absence of a triggering pulse, leaves the cathode at a potential which prevents the electron beam 30 from making a visible trace. To accomplish this, the blanking signal generator may be of conventional design arranged so that it is normally in a quiescent condition. In response to each pulse from the source 10, however, the generator 40 is operatively conditioned to supply an unblanking pulse $e_c$, shown in Fig. 2b, to the cathode 32 driving the cathode sufficiently negative to initiate or intensify the beam 30. As an example, the generator 40 may be a circuit of the type which is triggered by a pulse from a stable state to an unstable state and returns to the stable state after a predetermined interval of time. The unblanking pulse $e_c$ derived from the generator 40 has substantially a square wave shape which is initiated in a negative going sense at a time determined by the adjustment of delay line 39 and continues for a period determined by the adjustment of the generator 40. By an adjustment of the delay line and the generator, which may be observed on the viewing screen 35, then, the visible portion of trace 36 may be restricted to lie immediately adjacent the maximum point 29'.

Figure 4:
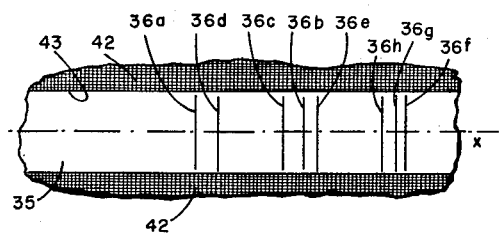
Fig. 4 is an enlarged fragmentary elevational view of the masked cathode ray screen of Fig. 1, illustrating the selective presentation of pulse maxima to provide a pulse-height line spectrum.

To eliminate the curvature in this limited portion of the trace 36, the vertical deflection amplifier 24 may be overdriven, increasing the gain for the vertical deflection signal $e_y$ to the extent that the curvature of the trace as it crosses the $x$ axis becomes imperceptible, as may be seen in Fig. 4. An opaque mask 42 may be disposed in front of the viewing screen 35 having an elongated translucent slit 43 exposing the portion of the screen 35 lying along and slightly above and below the $x$ axis thereof. In this manner only linear traces 36a, 36b . . . 36h representing the maximum values for exemplary pulses of the pulse signal $e_x$ will be exposed either for visual examination, for recording, or for photoelectric scanning, as desired.

Where, for example, the accuracy of the desired interpretation or the convenience of the user requires, a recorder 45 may be positioned opposite the portion of the screen 35 exposed through the slit 43 and may be energized at convenient intervals continuously for a given period to obtain a record of the traces then occurring on the screen. For many applications, the recorder 45 may conveniently be a conventional oscillographic camera which will provide a film record of the traces appearing on the screen.

Figure 2B:
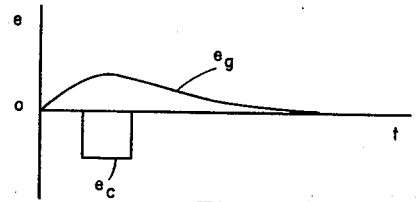

It is desirable that the line spectrum provided by the linear traces 36a . . . 36h represent quantitatively as well as qualitatively a pulse height spectrum. Where the line spectrum is presented on a viewing screen having relatively uniform phosphorescent and fluorescent properties, the brightness of each trace will nonetheless depend upon the velocity of the beam in executing the trace as well as the beam intensity. In executing the vertical traces 36a . . . 36h, the horizontal component of beam velocity is zero and the vertical component is proportional to the time derivative of the vertical deflection signal $e_y$. Thus, the beam velocity is proportional to the second time derivative of the pulse signal $e_x$ which, in turn, is proportional to the maximum pulse amplitude for similarly shaped pulses. To offset this tendency toward brighter traces for the smaller pulses, the linear amplifier 15 is coupled through a frequency compensated attenuator 47 to the control grid 33 of the cathode ray tube 20. A beam modulating signal $e_g$, shown in Fig. 2b, is thus applied to the control grid 33 to increase the intensity of the beam for the larger pulses. By suitably adjusting the attenuator 47, substantial uniformity of trace brightness may be obtained independent of the maximum amplitude of the pulses. It will be noted that the modulating signal $e_g$ is similar in shape to the signal $e_x$ but diminished in amplitude. Hence, the signal $e_g$ might alternatively be derived from a second linear amplifier (not shown) coupled to the preamplifier 13 and having a lower gain than the amplifier 15.

In operation, the source 10 is activated as by placing the radiation detector 12 in proximity to emanations of radioactivity. This may occur, in one application, when the detector 12 together with the preamplifier 13 incorporated in radioactivity well logging equipment are passed through a borehole. The signal $e_x$ thus provided by the signal source 10 will comprise numerous pulses of varying amplitude, each of substantially the same form or shape, and generally recurring in an aperiodic fashion. The rate of recurrence or distribution of pulse amplitudes will characterize the radiation and may be analyzed to derive information concerning earth formations traversed by the borehole, for example. The preamplifier 13 serves to amplify the signal from the detector 12 to a level sufficient for transmission of the intelligence.

A pulse arriving at the indicating device 11 is amplified with a linear reproduction of its maximum value by the amplifier 15 and the amplified signal is applied directly to the horizontal deflection amplifier 16. Simultaneously, the amplified signal is coupled to the differentiating circuit 22 so that a time derivative signal is obtained which is applied to the vertical deflection amplifier 24. The output signals of the horizontal and vertical deflection amplifiers 16 and 24 applied, respectively, to the horizontal and vertical deflection plates 18 and 28 will then be the pulse signal $e_x$ linearly proportional to the signal from the source 10 and the time derivative of the signal $e_y$ varying instantaneously as the time derivative of the signal $e_x$. While for some applications, it would be desirable to deflect an uninterrupted beam continuously in accordance with these signals $e_x$ and $e_y$ to produce traces similar to the loop pattern 36 in Fig. 3, this uninterrupted tracing has utility principally for relatively slow pulse counting rates. For the more rapid counting rates commonly encountered, the signal from the source 10 is applied to the delay line 39 adjusted so as to apply a triggering pulse to the blanking signal generator 40 just before an arriving pulse reaches its maximum value 29. The blanking signal generator 40, in turn, applies a square wave signal $e_c$ to the cathode 32 of a duration sufficient to initiate or intensify the beam 30 during the occurrence of the maximum amplitude of the pulse signal $e_x$. At the same time, the beam 30 is adjusted in intensity by the modulation signal $e_g$ applied to the control grid 33 by the linear amplifier 15 after attenuation in the attenuator 47.

In this manner, each pulse arriving from the source 10 causes a trace such as trace 36a to be produced on the viewing screen. By overdriving the vertical deflection amplifier 24, each such trace appears as a vertical line crossing the horizontal axis at a point therealong representing the maximum pulse amplitude. In the aggregate, these traces provide a line spectrum representing pulse height distribution.

It may be noted that the combined effect of the signals $e_g$ and $e_c$ is an illumination of the screen only during the trace of the maximum pulse amplitude and then with a brightness independent of the magnitude of the pulse. The variation in brightness along the $x$ axis observed during any period corresponding to the positions of traces crossing the $x$ axis will consequently be an accurate measure of the rate of occurrence of pulses, with the values of their maximum amplitudes represented along the $x$ axis. The pulse analyzing system of this invention thus provides an accurate line spectrum representing the pulse height distribution for a pulse signal.

With this accurate presentation of a line spectrum, the usual graph of pulse height distribution may be obtained in any conventional way. For example, developed film obtained with recorder 45 may be scanned by a microphotometer (not shown) and its output graphed as a function of the maximum signal values along the $x$ axis. Alternatively, the traces appearing through the mask 42 may be scanned directly with the microphotometer to obtain the same graphic record.

In some applications, however, the information necessary for interpretation of the pulse signal $e_x$ is the rate of occurrence of pulses with energies falling within a finite number of energy bands. Three such bands are represnted in Fig. 4 comprising traces 36a, 36d; traces 36c, 36b and 36e; and traces 36h, 36g and 36f, as examples. A plurality of microphotometers (not shown) might be optically coupled in fixed relation to spaces along the $x$ axis of the screen corresponding to these discrete energy bands so as to provide a simultaneous indication of the relative occurrences of pulses within these bands.

Figure 5:
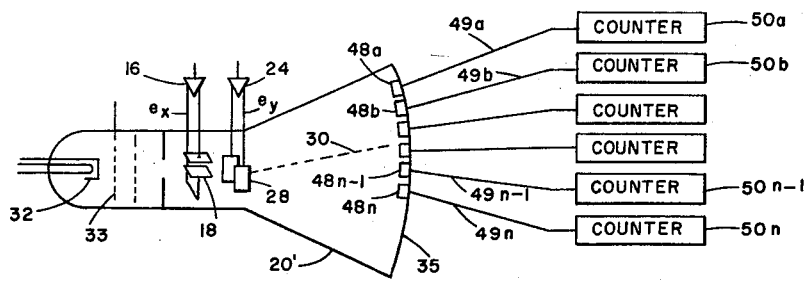
Fig. 5 is a schematic diagram illustrating modified portions of the apparatus of Fig. 1.

Alternatively, a cathode ray tube 20', shown in Fig. 5, with the horizontal or $x$ axis of the screen running vertically on the drawing, may be provided as a modification of a conventional cathode ray tube incorporating a plurality of anode targets 48a ... 48n disposed at discrete positions along the $x$ axis of the screen 35. Targets 48a ... 48n are connected by leads 49a ... 49n to corresponding pulse counters 50a ... 50n of conventional design which will register the number of traces impinging on each target. By disposing the targets at places along the $x$ axis representing regions where the beam 30 will impinge for various pulse energy bands to be studied, a direct indication of the occurrence of pulses in these energy bands may be obtained.

The operation of this modified tube 15' in the circuit of Fig. 1 will then be identical with tube 15 except that each trace will produce a pulse advancing the register of the counter corresponding to the target on which the trace impinges. If desired, the counters 50a ... 50n may have a control function in association with other apparatus without providing a visible indication of the pulse height distribution.

While a particular resistance-capacitance type of differentiating circuit has been shown, it will be evident that other circuit means may be employed, such as a resistance-inductance type of differentiating circuit yielding a time derivative of the electric pulse signal for application to the transverse set of deflection elements. Deflection elements other than electrostatic deflection plates may be employed such as the conventional magnetic coil deflection elements.

Where a high speed of response is not necessary mechanical beam deflection may be utilized. For example, a conventional electro-optical oscillograph (not shown) including transversely oriented mirror galvanometers may be suitably coupled to amplifiers 16 and 24 for sweeping a beam of light to provide a trace on sensitized film.

Because a time derivative signal is employed to sweep the beam across a reference axis and this time derivative signal is obtained substantially instantaneously with the arrival of each pulse, the presentation of pulse height distributions for rapidly recurring pulses is in no way limited by a fixed, recurrent sweep period. Thus, if two pulses are so closely adjacent in time as to present a single, double-peaked pulse, a trace will be made for each peak. Hence, so long as the pulse peaks themselves are spaced in time relation, the novel apparatus herein described will provide an accurate trace of each pulse height. At the same time, the traces of the pulses are presented in a line spectrum representing pulse height distribution without the necessity of stretching or extending the time duration of the pulses. Instead, the line form of the trace is obtained simply by increasing the gain of a deflection amplifier. In this way, extremely rapid pulse counting rates may be handled with accuracy and without undue complexity and expense.

While particular embodiments of the present invention have been shown and described, it is apparent that changes and modifications may be made without departing from this invention in its broader aspects, and therefore the aim in the appended claims is to cover all such changes and modifications as fall within the true scope and spirit of this invention.

I claim:

1. Apparatus for analyzing a pulse signal comprising a cathode ray tube having a cathode and a control electrode to control the intensity of the cathode ray and horizontal and vertical sets of deflection elements to control the position of the cathode ray, means for applying a pulse signal to one set of said deflection elements, means for applying the time derivative of the pulse signal to the other set of said deflection elements, cathode biasing means including a signal delay device and a blanking signal generator coupled thereto responsive to the pulse signal to intensify said cathode ray during only a maximum portion of each successive pulse, and biasing means responsive to the pulse signal for applying a signal to said control electrode proportional to the pulse signal amplitude whereby the luminosity of the maximum portions of successive pulses traced by said beam will be substantially constant with varying pulse amplitudes.

2. Apparatus for measuring a signal including a succession of pulses of varying amplitude, comprising a cathode ray tube having a horizontal and a vertical set of deflection plates for controlling the trace position of its beam relative to transverse deflection axes, means for applying a pulse signal to one set of said plates, means for applying the time derivative of the pulse signal to the other set of said plates, means for limiting said trace to a short spacing above and below the deflection axis representing the value of the pulse signal, means for adjusting the intensity of said beam in accordance with the amplitude of the pulse signal to make successive traces substantially uniform in luminosity, and means optically coupled to said tube for providing an indication of the variations in luminosity along said value-representing deflection axis.

3. A radiation analyzing system, comprising a radiation detector for supplying a pulse signal composed of similarly shaped pulses of varying pulse amplitude representing the character of incident radiation, a cathode ray tube having a beam control electrode, two beam deflecting circuits and a screen upon which a beam may impinge in relation to transverse deflection axes, linear circuit means for connecting one of said beam deflecting circuits with said detector, differentiating circuit means for connecting the other beam deflecting circuit with said detector, whereby the maximum values of said pulse signal are traced by the beam on said screen at a transverse crossing of one of said deflection axes, and biasing attenuator means connecting said detector via said linear circuit means with said beam control electrode to increase the beam intensity in proportion to the pulse amplitude to compensate for increases in beam trace speed with increases in maximum pulse value.

4. A radiation analyzing system comprising means for supplying a variable amplitude electric pulse signal, means responsive to said pulse signal for proportionately deflecting a beam in the direction of one of a pair of orthogonal axes; means responsive to said pulse signal for providing a signal which varies as substantially the time derivative of said pulse signal, means responsive to said time derivative signal proportionately deflecting said beam in the direction of the other of said axes to sweep said beam across said one axis at the instant of a maximum pulse amplitude at a point along said one axis corresponding to said maximum pulse amplitude, and beam control biasing means responsive to said pulse signal for proportionately varying the intensity of said beam to compensate for the increase in speed with which said beam is swept across said one axis as said maximum pulse amplitude increases.

References Cited in the file of this patent

UNITED STATES PATENTS

| | | |
|---|---|---|
| 2,363,810 | Schrader et al. | Nov. 28, 1944 |
| 2,423,104 | Labin | July 1, 1947 |
| 2,537,081 | Page et al. | Jan. 9, 1951 |
| 2,560,166 | Glenn | July 10, 1951 |
| 2,564,908 | Kuchinsky | Aug. 21, 1951 |
| 2,605,332 | Parsons | July 29, 1952 |

OTHER REFERENCES

Publication: Scientific Instruments, vol. 29, pages 157–160 of May 1952.